United States Patent [19]
Riquier et al.

[11] Patent Number: 5,295,504
[45] Date of Patent: Mar. 22, 1994

[54] DEVICE FOR CONTROLLING DISCHARGE FROM A PNEUMATIC ENCLOSURE UNDER PRESSURE, IN PARTICULAR FOR RAPID AND CONTROLLED DEFLATION OF A TIRE

[75] Inventors: Didier Riquier, Persan; Alain Lelievre, Le-Mesnil-En Thelle, both of France

[73] Assignee: Hutchinson, Paris, France

[21] Appl. No.: 913,910

[22] Filed: Jul. 16, 1992

[30] Foreign Application Priority Data

Jul. 17, 1991 [FR] France .................. 91 09042

[51] Int. Cl.$^5$ .................................... F16K 15/20
[52] U.S. Cl. .................. 137/233; 137/230; 152/428; 251/94
[58] Field of Search ............. 152/431, 427, 415, 429, 152/428; 137/226, 230, 233; 251/94

[56] References Cited

U.S. PATENT DOCUMENTS

| | | | |
|---|---|---|---|
| 1,179,668 | 4/1916 | Shewmaker | 137/230 |
| 4,151,863 | 5/1979 | Stevens et al. | 137/230 X |
| 4,445,527 | 5/1984 | Leimbach | 137/226 |
| 4,681,148 | 7/1987 | Decker, Jr. et al. | 152/431 |
| 4,883,107 | 11/1989 | Keys | 152/431 |

FOREIGN PATENT DOCUMENTS

| | | |
|---|---|---|
| 1051145 | 3/1958 | Fed. Rep. of Germany . |
| 9000659 | 9/1990 | Fed. Rep. of Germany . |
| 2328585 | 5/1977 | France . |
| 2655703 | 6/1991 | France . |

Primary Examiner—Michael W. Ball
Assistant Examiner—Francis J. Lorin
Attorney, Agent, or Firm—Browdy and Neimark

[57] ABSTRACT

A device for controlling discharge from a pneumatic enclosure under pressure, in particular for controlling rapid deflation of a tire to a predetermined pressure value after the device has been assembled to a valve fitted to the enclosure, the device comprising a pushbutton for actuating a striker adapted to cooperate with the deflation pin of the valve and slidably mounted in a case which provides a chamber coaxially around the striker for the deflation pin, at least one vent hole being provided for exhausting the gaseous fluid contained in the enclosure to be deflated, and the striker being slidably mounted in a piston-washer received in said chamber and adapted to cooperate with the striker by a wedging action to hold the striker in a position that allows escape of the gaseous fluid contained in the enclosure.

7 Claims, 1 Drawing Sheet though the device described in that document includes a pushbutton for actuating a rod suitable for cooperating with the deflation pin of the valve, which pushbutton is mounted in a sleeve and can be secured thereto by means of a coupling having retractable balls, the sleeve itself being slidably mounted in a case which provides a chamber coaxial with the actuator rod for the deflation pin and which has vent holes pierced through its side wall to discharge the gaseous fluid contained in the enclosure to be deflated. Although the operation of such a device is satisfactory, it is nevertheless still too expensive to be commercially successful, in particular when it is recalled that the civilian or military vehicles to be equipped with the device generally comprise a relatively large number of wheels.

DEVICE FOR CONTROLLING DISCHARGE FROM A PNEUMATIC ENCLOSURE UNDER PRESSURE, IN PARTICULAR FOR RAPID AND CONTROLLED DEFLATION OF A TIRE

The invention relates to a device for controlling discharge from an enclosure under pressure and although this mention should not be taken as being limiting in any way, it relates in particular to a device adapted to be assembled to the valve of a pneumatic wheel to cause it to be deflated automatically down to a predetermined pressure value.

BACKGROUND OF THE INVENTION

It is known that the mobility and ground-holding abilities of vehicles, both civilian vehicles and military vehicles, depend on the pressure to which their tires are inflated, and that it may be necessary to reduce tire pressure from a normal running pressure, for example when a vehicle needs to cross ground that is sandy, muddy, or the like. The pressure to which the tires are inflated must generally be reduced quickly and also to a well-determined value. For this purpose, proposals have already been made either for systems for adjusting tire pressure under control from a vehicle cabin (which systems are extremely expensive and therefore of limited application), or else for devices that can be operated by hand, as described in French Patent 2 655 703 in the name of the present Assignee, for example. The device described in that document includes a pushbutton for actuating a rod suitable for cooperating with the deflation pin of the valve, which pushbutton is mounted in a sleeve and can be secured thereto by means of a coupling having retractable balls, the sleeve itself being slidably mounted in a case which provides a chamber coaxial with the actuator rod for the deflation pin and which has vent holes pierced through its side wall to discharge the gaseous fluid contained in the enclosure to be deflated. Although the operation of such a device is satisfactory, it is nevertheless still too expensive to be commercially successful, in particular when it is recalled that the civilian or military vehicles to be equipped with the device generally comprise a relatively large number of wheels.

To mitigate this cost drawback, Applicants have investigated the possibility of providing a device which is even simpler that the previously known device, and which like the previous device is hand-operated, and is suitable for obtaining reliable and rapid deflation of vehicle tires under conditions that are quantitatively reproducible.

SUMMARY OF THE INVENTION

According to the present invention, there is provided a device enabling discharge from a pneumatic enclosure under pressure to be controlled, in particular for rapid deflation of a tire to a predetermined pressure value when the device is assembled to a valve fitted to the enclosure, said device comprising a pushbutton for actuating a striker adapted to cooperate with the deflation pin of the valve and slidably mounted in a case which provides a chamber coaxially around the striker for the deflation pin, and which is pierced by at least one vent hole for exhausting the gaseous fluid contained in the enclosure to be deflated, wherein the striker is slidably mounted in a piston-washer located in said chamber and adapted to cooperate with the striker by a wedging action to hold the striker in a position that allows escape of the gaseous fluid contained in the enclosure to be deflated until the predetermined pressure value is reached.

Said predetermined pressure value is set by means of a rated spring disposed in the coaxial chamber around the striker between the piston-washer and the bottom of the chamber opposite to said washer.

In a preferred embodiment, the piston-washer is wedged against the striker of the deflation pin by being put in said chamber at a slant under the action of a locking abutment projecting into said chamber coaxial with the striker.

In a preferred embodiment, the chamber coaxial with the striker is constituted by a cup having a partly threaded side wall with which is adapted to cooperate a tapped plug enabling the setting of the spring to be adjusted.

In a particularly advantageous embodiment, the bottom of the plug is pierced by holes which open out into the chamber coaxial with the striker and through which the gaseous fluid contained in the enclosure to be deflated can likewise escape when the device is put into operation.

Given that a device of the invention can be permanently affixed to the end of a tire valve (and thus be subjected to spattering from mud, sand, etc. . .), provision may also be made for protecting the chamber that is coaxial with the striker by means of a screen filter placed over the holes in the plug and interposed between the plug and the cup delimiting the chamber.

BRIEF DESCRIPTION OF THE DRAWING

An embodiment of the invention is described by way of example with reference to the accompanying drawing, in which.

DETAILED DESCRIPTION

Figure 2:
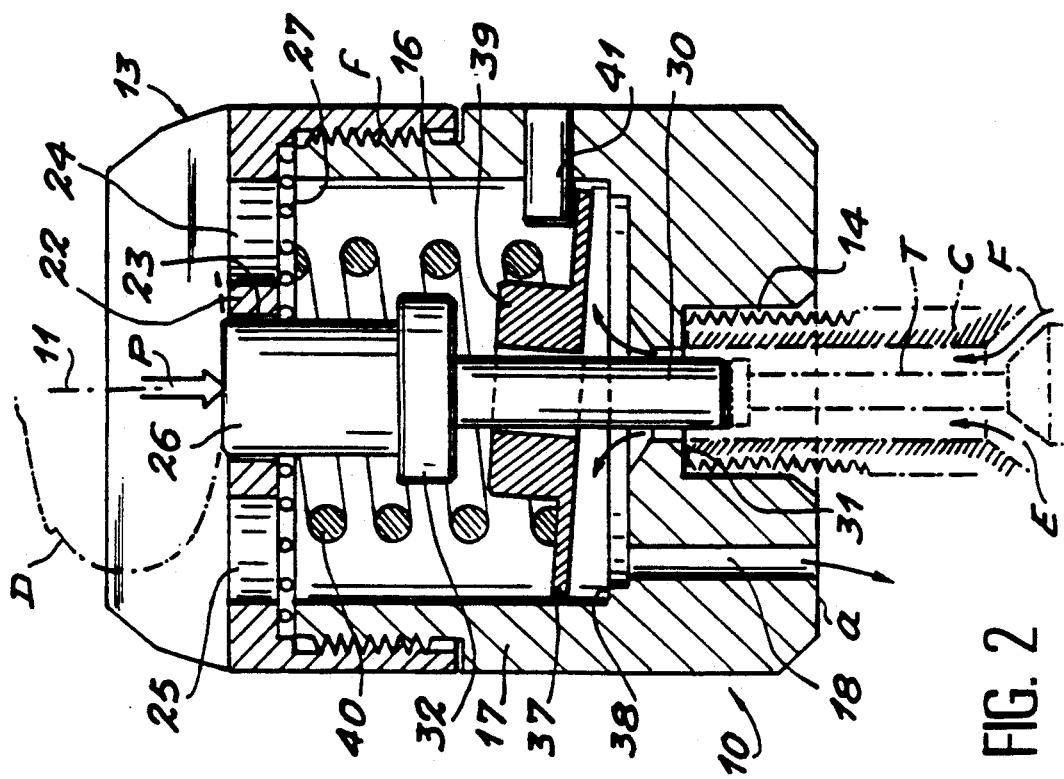
FIG. 2 is a similar view, but rotated through 90° relative to FIG. 1 and showing an in-use condition.

In the following description, the invention is described as being applied to a device for the purpose of rapidly deflating a motor vehicle tire. In such an application, the device comprises a body or case 10 which is generally cylindrical in shape about an axis 11, having a first portion 12 which is somewhat in the form of a cup and a plug 13 which closes the cup 12. The cup is pierced by a tapped bore 14 to enable it to be screwed onto the end C of a valve (not shown) having a deflation pin shown diagrammatically at T. The bore 14 extends, opposite from face a of portion 12 via a countersunk portion 15 (which is initially cylindrical and then flares) that opens out into a chamber 16 the axis of which is axis 11. The side wall 17 of chamber 16 is threaded at its end opposite its bottom as shown at f and said base is pierced by a vent hole 18 which is calibrated to set up a predetermined value of pressure drop when the chamber 16 is in communication in the manner described below with the enclosure whose controlled discharge is desired and which is represented highly diagrammatically by reference E.

The thread f of the first portion 12 is adapted to cooperate with the tapping in the plug 13 which is itself shaped to form a notch 19 having ribs 20 and 21 on either side which are somewhat trapezium-shaped in right cross-section. As can clearly be seen in FIG. 2, the bottom wall 22 of plug 13 is pierced by a hole 23 through which is slidably received a pushbutton 26. The pushbutton has a front portion 32 of larger diameter than the remainder of its body and there are two holes 24 and 25 in bottom wall 22 for putting chamber 16 into communication with the atmosphere; a screen filter 27 (which is installed when the plug 13 is screwed onto the portion 12) serves to prevent foreign bodies such as particles of mud or sand, etc... penetrating into the chamber 16 through the holes 24 and 25.

Figure 1:
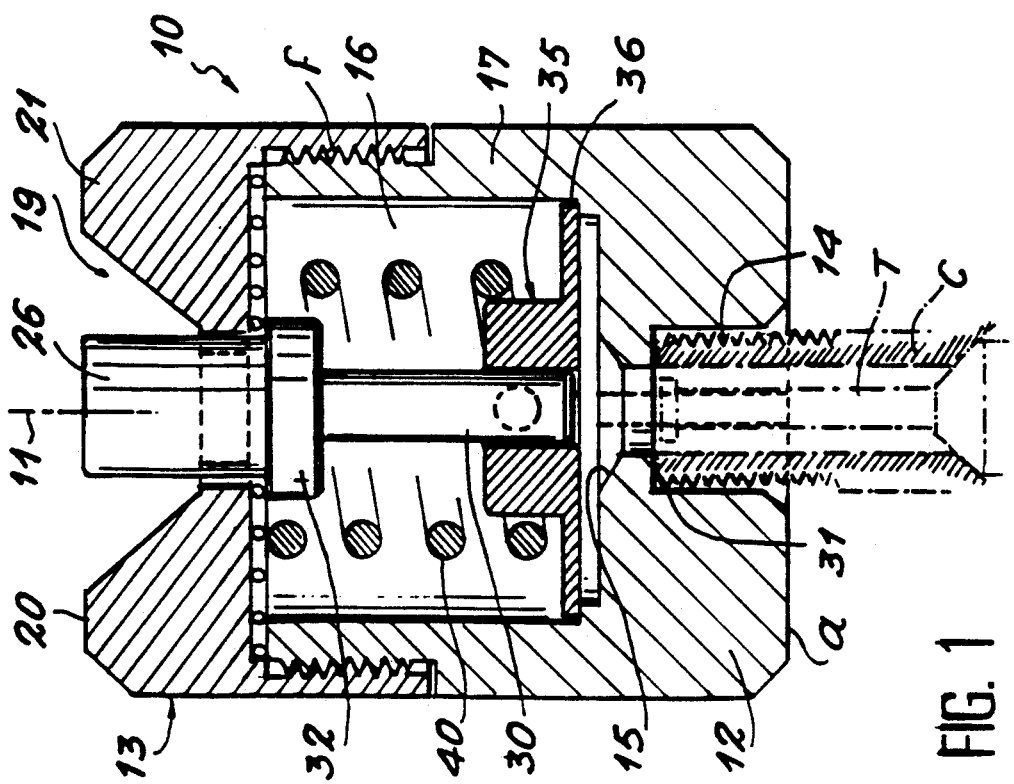
FIG. 1 is a longitudinal section view through a device of the invention in a first or "rest" condition.

A striker 30 is also housed in chamber 16 and its length is such as to ensure that it does not project from the front face 31 of the tapped bore 14 when the device is in its non-operative condition as shown in FIG. 1, whereas said striker is adapted to cooperate with the deflation pin T of the valve C when it has been displaced through a sufficient distance from its rest condition to its operating condition, as shown in FIG. 2. The striker is slidably mounted in a piston-washer 35 in which the washer per se 36 is of the same diameter as the chamber 16 and which is extended towards the plug 13 by a cylindrical projection 39. In the space between the washer 36 (which in the rest position of the device has its margin 37 resting on a shoulder 38 in the chamber 16) and the front face of the plug 13, is located a rated helical spring 40 which surrounds the pushbutton 26 and the striker 30, while a peg 41 is received in the cylindrical wall 17 of the portion 12 so that is projects radially into the chamber 16 above the washer 36.

The device operates as follows:

In its initial condition, as shown in FIG. 1, the device in inoperative. The striker 30 is at a distance from the deflation pin T of the valve of the enclosure on which the device is installed, and the spring 40 is not compressed.

To cause discharge, e.g. to deflate the tire having the valve on which the device is installed, the user causes the pushbutton 26 to be pushed into the chamber 16 by applying thrust in the direction of arrow P, which is simply achieved by pressing a finger (shown diagrammatically at D) onto the end of the pushbutton. This thrust as transmitted to striker 30 causes it to move in direction of arrow P, and when the striker 30 comes into contact which the deflation pin T of the valve, it pushes the pin back, thereby operating the valve to open a passage for the fluid contained in the enclosure, as represented by arrow F. The pressure exerted by the fluid on the washer 36 causes the washer to lift off the shoulder 38 until it comes into abutment against peg 41, thereby causing the piston-washer to take up a slanting position as shown in FIG. 2 where it is urged against the striker 30 thus wedging it in the position shown in FIG. 2 which is the operative condition. The fluid contained in the enclosure E escapes via the vent hole 18 and also through the orifices 24 and 25 because of the clearance that exists between the piston-washer 35 and the wall of the chamber 16, thereby progressively decreasing the pressure and when said pressure reached a value corresponding to the rated value of the spring 40, the spring pushes down the washer 36 to return it to the position shown in FIG. 1, thereby releasing the striker 30 and the valve pin T and interrupting deflation of the enclosure.

The operation of the device of the invention is thus not only reliable and rapid, but it also provides results that are quantitatively reproducible.

We claim:

1. A device for controlling discharge from a pneumatic enclosure under pressure, to a predetermined pressure value after the device has been assembled to a valve fitted to the enclosure, the valve including a deflation pin, said device comprising a case which provides a chamber, a pushbutton slidably mounted within said case, a striker adapted to cooperate with the deflation pin of the valve when said pushbutton is pressed, at least one vent hole in said case for exhausting the gaseous fluid contained in the enclosure to be deflated and a piston-washer received in said chamber wherein said striker is slidably mounted in said piston-washer, biasing means for maintaining said piston-washer in a first position when said device is in a non-use mode, said piston-washer being adapted to cooperate with the striker by a wedging action of said piston-washer in a second position to hold the striker in a location against the action of said biasing means during usage of said device when said pushbutton is pressed and when the pressure within the enclosure exceeds said predetermined value, which second position allows escape of the gaseous fluid contained in the enclosure to be deflated until the predetermined pressure value is reached.

2. A device according to claim 1, wherein said wedging action of the piston-washer against the striker of the deflation pin results from a locking abutment projecting into said chamber.

3. A device according to claim 1, wherein said chamber is constituted by a cup having a side wall which is threaded in part and which is adapted to cooperate with a tapped plug for adjusting said predetermined pressure value.

4. A device according to claim 3, wherein said biasing means comprises a rated spring located between said piston-washer and the bottom wall of said plug.

5. A device according to claim 3, wherein the bottom wall of the plug is pierced by holes which open out into the chamber disposed coaxially around the striker and through which the gaseous fluid contained in the chamber to be deflated can also escape.

6. A device according to claim 5, further comprising a filter located over said holes of the plug, between the plug and the cup delimiting said chamber.

7. A device for controlling discharge from a pneumatic enclosure under pressure, to a predetermined pressure value after the device has been assembled to a valve fitted to the enclosure, the valve including a deflation pin, said device comprising a case which provides a chamber, a pushbutton slidably mounted within said case, a striker adapted to cooperate with the deflation pin of the valve when said pushbutton is pressed, at least one vent hole in said case for exhausting the gaseous fluid contained in the enclosure to be deflated and a piston-washer received in said chamber wherein said striker is slidably mounted in said piston-washer, biasing means for maintaining said piston-washer in a first position when said device is in a non-use mode, and a locking abutment projecting into said chamber so as to inhibit movement of said piston-washer at one position thereof from movement against said biasing means, whereby when said pushbutton is pressed causing said striker to cooperate with the deflation pin of the valve to release gaseous fluid from the enclosure at a pressure greater than said predetermined pressure value, the gaseous fluid drives said piston-washer against said biasing means and causes said piston-washer to become wedged against said striker to hold said striker in a second position until the pressure falls to said predetermined pressure value.

* * * * *